April 4, 1939. W. E. BRELSFORD 2,153,451
PLOWSHARE STRUCTURE
Filed April 20, 1938
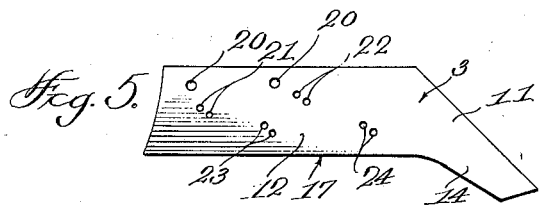
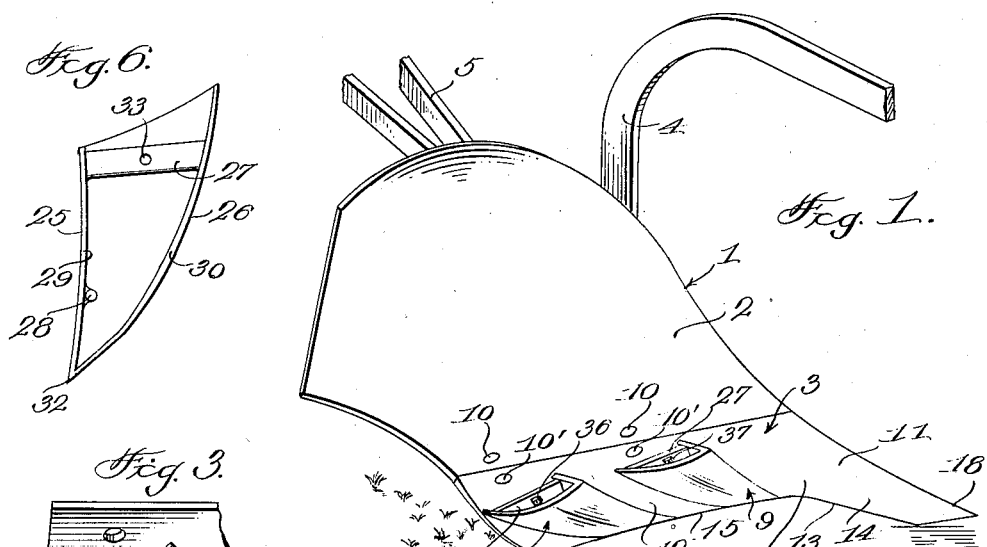
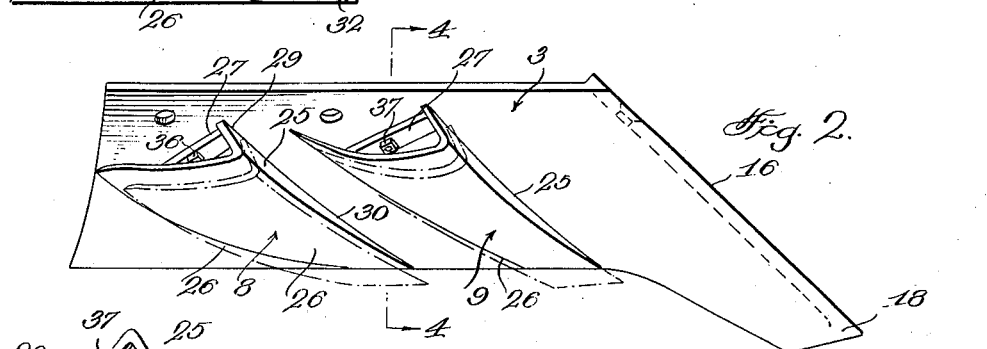
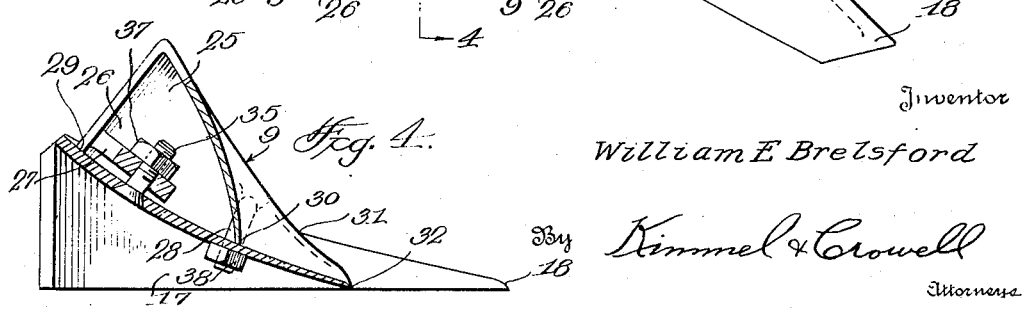
Inventor
William E. Brelsford
By Kimmel & Crowell
Attorneys Patented Apr. 4, 1939

2,153,451

UNITED STATES PATENT OFFICE 2,153,451

PLOWSHARE STRUCTURE

William E. Brelsford, Mendota, Ill., assignor of one-third to Kenneth Austin Davis, Mendota, Ill.

Application April 20, 1938, Serial No. 203,174

5 Claims. (Cl. 97—125)

This invention relates to a plowshare structure designed primarily for plows of the tractor type, but it is to be understood that a plowshare structure, in accordance with this invention is for employment in connection with any type of plow for which it may be found applicable.

The invention has for its object to provide, in a manner as hereinafter set forth, a plowshare structure including a plowshare element having disposed on one side thereof pointed soil pulverizing elements, and with the said several elements coacting, when the plow is drawn through the ground to break the latter and turn the soil over in a broken or pulverized condition, thus saving the extra operation of pulverizing after plowing.

A further object of the invention is to provide, in a manner as hereinafter set forth, a plowshare structure including a plowshare element having disposed on one side thereof a plurality of pointed adjustable soil breaking and pulverizing elements.

A further object of the invention is to provide, in a manner as hereinafter set forth, a plowshare structure including a plurality of points which practically eliminates the cost of plow sharpening as the points may be built up when needed.

A further object of the invention is to provide, in a manner as hereinafter set forth, a plowshare structure so formed as to materially increase the extent of plowing, without attention, with respect to a plowshare of the form now generally employed.

Further objects of the invention are to provide, in a manner as hereinafter set forth, a plowshare structure which is simple in its construction and arrangement, strong, durable, compact, adjustable, readily assembled, thoroughly efficient in its use, conveniently repaired when occasion requires, and comparatively inexpensive to manufacture.

Embodying the objects aforesaid and to others which may hereinafter appear, the invention consists of the novel construction, combination and arrangement of parts as will be more specifically referred to and illustrated in the accompanying drawing, wherein an embodiment of the invention is shown, but it is to be understood that changes, variations, and modifications may be resorted to which fall within the scope of the invention as claimed.

In the drawing:

Figure 1 is a fragmentary view in perspective of a tractor plow having a plowshare structure in accordance with this invention, Figure 2 is a fragmentary view in elevation, looking towards the outer side of the plowshare structure and showing the pointed soil breaking and pulverizing elements in non-adjusted position in full lines and in adjusted position in dotted lines, Figure 3 is a fragmentary view partly in section and in elevation looking towards a pointed soil breaking and pulverizing element, Figure 4 is a section on line 4—4, Figure 2, Figure 5 is an elevation looking towards the outer side of the plowshare element and upon a reduced scale, and Figure 6 is a rear elevation of a pointed soil breaking and pulverizing element.

With reference to the drawing 1 generally indicates a plow comprising a moldboard 2 and a plowshare structure 3 in accordance with this invention. The hitch between the plow 1 and a tractor, not shown, is designated 4. The handle bars for the plow are indicated 5.

The structure 3 includes a plowshare element or member 7 and a pair of spaced pointed soil breaking and pulverizing elements 8, 9 adjustably connected to element 7 on the outer side thereof.

The element 7 is disposed in downwardly and forwardly extended relation with respect to the lower edge of the moldboard 2. The upper edge of element 7 is secured against the said lower edge by a suitable coupling, not completely shown, and which includes the holdfast means 10 passing through the moldboard 2 and element 7 respectively. The latter includes a leading portion 11 and a follower portion 12 of less width than, extending rearwardly from and merging at its forward end into the upper part of the follower or rear edge 13 of portion 11. The latter inclines forwardly from its upper to its lower end and has the part 14 thereof which is disposed in extended relation with respect to the lower edge 15 of portion 12 gradually decreasing in width towards its lower end and pointed. Formed integral with the inner side of portion 11 and flush throughout with the leading edge 16 of the latter is an inwardly directed flange 17 which gradually decreases in width from its upper to its lower end. The flange 16 and portion 11 coact to form a point 18. The flange 17 is formed with an opening 19 for the passage of means, not shown, for connecting element 7 to a landside, not shown. The element 7 is of concavo-convex contour in transverse section. The portion 12 of element 7 is formed with openings 20 for the passage of the holdfast means 10' and also with spaced pairs of spaced openings. Each pair of openings is disposed diagonally of the said portion 12. The openings of each pair are arranged in close spaced relation. The openings of each pair are intersected centrally by a line disposed diagonally of element 1. The openings of each pair are disposed in a different diagonal plane with relation to element 7. The pairs of openings are designated 21, 22, 23, 24. The pairs of openings 23, 24 are arranged forwardly of and below the pairs of openings 21, 22. Each pair of openings consists of an upper and a lower opening and with the latter disposed forwardly of the upper opening. The upper pairs of openings are arranged below the openings 20. The purpose of the pairs of openings 21, 22, 23, 24 will be hereinafter referred to.

The elements 8, 9 are tapered and of like form, and each consists of a one-piece body formed of a leading portion 25, a follower portion 26, an inner brace bar 27 and a coupler 28. The portion 25 extends inwardly from the leading side edge of the portion 26 and gradually decreases in width from the upper to the lower end of the element. The portion 26 gradually decreases in width from the upper to the lower end of the element.

The coupler 28 is in the form of a rearwardly extending threaded bolt integral at its front end with the inner face of portion 26, intermediate the upper and lower ends of the latter and disposed in proximity to the inner face of portion 25.

The front edge of portion 25 merges into the leading edge of portion 26. The portion 25 throughout is of a contour corresponding to the segment of a circle. The rear edge 29 of portion 25 is of a contour corresponding to the segment of a circle whereby when element 8 or 9 is in active position, the said edge 29 will conform in contour to and snugly seat on the outer side face of the element 3 (Figure 4). The portion 26 in transverse cross section is of a contour corresponding to the segment of a circle. The portion 26 is disposed on a curve extending rearwardly from its leading edge to the follower edge 30 thereof. The edge 30 is of a contour corresponding to the segment of a circle and when element 8 or 9 is in active position the said edge 30 will conform in contour to and snugly seat on the outer side face of the element 3 (Figure 4). The portion 26 inclines inwardly from its upper to its lower end and has its outer face adjacent its lower end formed with a concaved depression 31. The lower end parts of the portions 25, 26 coact to form a point 32.

The brace bar 27 is of strap-like form, has its ends integral with the inner faces of the portions 25, 26 in proximity to the edges 29, 30 and is formed intermediate its ends with an opening 33. The coupler 28 is of a length to extend rearwardly beyond the open side of element 8 or 9. The lower end of the outer face of the portion 26 is beveled.

There is associated with the elements 8, 9, bolts 34, 35 respectively, and clamping nuts 36, 37. There is also associated with each of said elements a clamping nut 38. Bolt 34 is for extension through one of the openings 21 and the opening 33 in the bar 27 of element 8. The nut 36 is for mounting on bolt 34 to bind against said bar. The coupler 28 of element 8 is for extension through one of the openings 23 and one of the nuts 38 is for mounting on coupler 28 to bind against the inner side of element 3. Bolt 35 is for extension through one of the openings 21 and the opening 33 in the bar 27 of element 9. The nut 37 is for mounting on bolt 35 to bind against bar 27 of element 9. The coupler 28 of element 9 is for extension through one of the openings 34 and the other nut 28 is for mounting on coupling 28 of element 9 to bind against the inner side of element 3.

The bolts 34, 35, nuts 36, 37, 38, couplers 28, in connection with selected openings 21, 22, 23, 24 and the openings in the bars 27, provide for detachably securing the elements 8, 9 in forwardly directed diagonal relation with respect to the portion 12 of the element 3. When an upper opening 21, an upper opening 22, an upper opening 23 and an upper opening 24 are employed for the passage of the bolts and couplers, the lower ends of the elements 8 and 9 will be flush with the lower edge of portion 12 of element 3. When a lower opening 21, a lower opening 22, a lower opening 23 and a lower opening 24 are employed for the passage of the bolts and couplers, the lower ends of the elements 8 and 9 will be extended beyond the lower edge of portion 12 of element 3 as per the dotted line showing Figure 2.

What I claim is:

1. A plowshare structure including a plowshare member formed of a leading part and a follower part, said leading part being pointed, and a plurality of pointed soil breaking and pulverizing elements positioned against and disposed in diagonal relation with respect to the outer side of said following part, each of said elements having the front thereof in transverse cross section of a contour corresponding to the segment of a circle.

2. A plowshare structure including a plowshare member formed of a leading part and a follower part, said leading part being pointed, and a plurality of pointed soil breaking and pulverizing elements positioned against and disposed in diagonal relation with respect to the outer side of said following part, each of said elements including a front gradually decreasing in width from its upper to its lower end, inclining inwardly from its upper to its lower end and having the transverse cross sectional contour thereof corresponding to the segment of a circle.

3. In a plowshare structure, a pointed upstanding soil breaking and pulverizing element including a leading part gradually decreasing in width from its upper to its lower end and including front and rear edges, a rearwardly extending curved follower part merging at its forward side into the front edge of the leading part and including a rear edge, said follower part inclining inwardly from its upper to its lower end, and an apertured brace bar having its ends integral with the inner faces of said parts, said leading part being disposed inwardly at right angles to the leading side of the follower part.

4. In a plowshare structure, a pointed upstanding soil breaking and pulverizing element including a leading part gradually decreasing in width from its upper to its lower end and including front and rear edges, a rearwardly extending curved follower part merging at its forward side into the front edge of the leading part and including a rear edge, said follower part inclining inwardly from its upper to its lower end, an apertured brace bar having its ends integral with the inner faces of said parts, said leading part being disposed inwardly at right angles to the leading side of the follower part, and a rearwardly directed coupler integral at its front end with the inner face of said follower part arranged in proximity to the inner face of and extending rearwardly beyond the rear edge of said leading part.

5. In a plowshare structure, a plowshare member formed of a pointed leading part and a follower part of less width than said leading part, a plurality of pointed, tapered, spaced soil breaking and pulverizing elements positioned against the outer side of said following part, each of said elements having its front face of a contour corresponding to the segment of a circle and inclining inwardly from its upper to its lower end, and means for adjustably connecting said elements to the said follower part.

WILLIAM E. BRELSFORD.